United States Patent [19]
Ho et al.

[11] Patent Number: 6,115,203
[45] Date of Patent: Sep. 5, 2000

[54] EFFICIENT DRIVE-LEVEL ESTIMATION OF WRITTEN-IN SERVO POSITION ERROR

[75] Inventors: Hai T. Ho, Westminster; Toan Q. Doan, West Lafayette; Bruce A. Liikanen, Berthoud, all of Colo.

[73] Assignee: Maxtor Corporation, Longmont, Colo.

[21] Appl. No.: 09/016,552

[22] Filed: Jan. 30, 1998

[51] Int. Cl.$^7$ .................................................. G11B 5/596
[52] U.S. Cl. ............................................................. 360/77.04
[58] Field of Search .............................. 360/77.04, 77.02, 360/77.08, 77.11

[56] References Cited

U.S. PATENT DOCUMENTS

| | | | |
|---|---|---|---|
| 4,412,165 | 10/1983 | Case et al. ................................. 318/636 |
| 5,270,885 | 12/1993 | Satoh et al. ............................ 360/77.04 |
| 5,404,253 | 4/1995 | Painter ................................... 360/77.04 |
| 5,608,586 | 3/1997 | Sri-Jayantha et al. ................ 360/77.04 |
| 5,822,147 | 10/1998 | Kisaka ................................ 360/77.04 X |
| 5,825,578 | 10/1998 | Shrinkle et al. .................. 360/77.04 X |
| 5,854,722 | 12/1998 | Cunningham et al. .............. 360/77.04 |
| 5,886,846 | 3/1999 | Pham et al. ....................... 360/77.04 X |
| 5,926,338 | 7/1999 | Jeon et al. ........................... 360/77.04 |

*Primary Examiner*—Andrew L. Sniezek
*Attorney, Agent, or Firm*—David M. Sigmond

[57] ABSTRACT

The invention relates to a disk drive servo apparatus, and method for implementing the same, that maintains a transducer on a substantially non-perturbed path despite the fact that the tracks were written in a perturbed manner by a servo track writer. The invention utilizes a non-causal filter to determine servo track writer repetitive run-out (STW_RRO) values for each sector of each track at the drive level. The STW_RRO values are stored, preferably in their respective servo sectors on the surface of the disk, for use during track following operations. During read and write operations, the STW_RRO values are retrieved from storage and are used to generate position error signals necessary to maintain the transducer on the desired path.

20 Claims, 5 Drawing Sheets

EFFICIENT DRIVE-LEVEL ESTIMATION OF WRITTEN-IN SERVO POSITION ERROR

FIELD OF THE INVENTION

The invention relates in general to transducer positioning in a magnetic data storage system and, more particularly, to compensation for repetitive run-out (RRO) created by a servo track writer (STW) in a magnetic data storage system.

BACKGROUND OF THE INVENTION

A disk drive is a data storage device that stores digital data in tracks on the surface of a data storage disk. Data is read from or written to a track of the disk using a transducer that is held close to the track while the disk spins about its center at a substantially constant angular velocity. To properly locate the transducer near the desired track during a read or write operation, a closed-loop servo scheme is generally implemented that uses feedback data read from the disk surface to align the transducer with the desired track. The servo data is written to the disk using a servo track writer (STW).

In an ideal disk drive system, the tracks of the data storage disk are non-perturbed circles situated about the center of the disk. As such, each of these ideal tracks includes a track centerline that is located at a known constant radius from the disk center. In an actual system, however, it is difficult to write non-perturbed circular tracks to the data storage disk. That is, problems (such as inaccuracies in the STW and disk clamp slippage) can result in tracks that are written differently from the ideal non-perturbed circular track shape. Positioning errors created by the perturbed nature of these tracks are known as written-in repetitive run-out (STW_RRO). The perturbed shape of these tracks complicate the transducer positioning function during read and write operations because the servo system needs to continuously reposition the transducer during track following to keep up with the constantly changing radius of the track centerline with respect to the center of the spinning disk.

In certain conventional systems, as will be understood by those skilled in the art, the STW is used to directly measure the STW_RRO for each track of a disk so that compensation values may be generated and used to position the transducer along an ideal track centerline. In such systems, the STW must measure the STW_RRO of each track of a disk one track at a time. Because (1) a typical disk drive has four or more disks, (2) a typical disk contains over 10,000 tracks per inch (TPI) and (3) typical disk rotation speeds are around 5400 revolutions per minute (RPM), the STW could be tied-up for several hours in measuring the STW_RRO for one disk drive. The values of the STW_RRO for each track (or section of track) are then stored on the disk for use during transducer positioning. For an example of a disk drive system that is similar to the above described system, reference is made to U.S. Pat. No. 4,412,165 to Case et al. entitled "Sampled Servo Position Control System."

As is well-known in the art, STW's are very expensive and, therefore, only a limited number of STW's are available at a disk drive manufacturing facility. Accordingly, by tying-up the STW's for extended periods of time in measuring the STW_RRO for each disk drive, the manufacturing throughput/efficiency will be dramatically decreased.

Therefore, it would be advantageous if a system were provided for compensating for the STW_RRO without requiring the use of a STW to determine the STW_RRO so that such system could be implemented in a high volume production environment.

SUMMARY OF THE INVENTION

The invention relates to a disk drive transducer positioning system and method for implementing the same that is capable of canceling written-in repetitive run-out in substantially real time. Using the system, the transducer of the disk drive will follow a substantially non-perturbed circular path over the disk even though the written track is perturbed as compared with an ideal track. The system provides a significant improvement in, at least, track misregistration, write fault performance and seek settling time over disk drives that do not include the system. The system is of particular benefit in systems having a relatively high track density.

In accordance with the invention a disk drive system is disclosed. In one embodiment, the disk drive system comprises a data storage disk having one or more tracks. Each of the tracks have an ideal shape and an actual written shape. The disk drive further includes means for estimating the actual written shape of the track. The means used does not include a STW. Rather, the means uses the disk drive containing the data storage disk.

A method of generating compensation values for a disk drive is also disclosed. One method includes the steps of: (1) providing a data storage disk in the disk drive, the data storage disk having a track, the track having an ideal shape and an actual written shape; and, (2) estimating the actual written shape of the track using the disk drive containing the data storage disk.

Other objects, features and advantages of the invention will be apparent from the following specification taken in conjunction with the following drawings.

DETAILED DESCRIPTION

Figure 1:
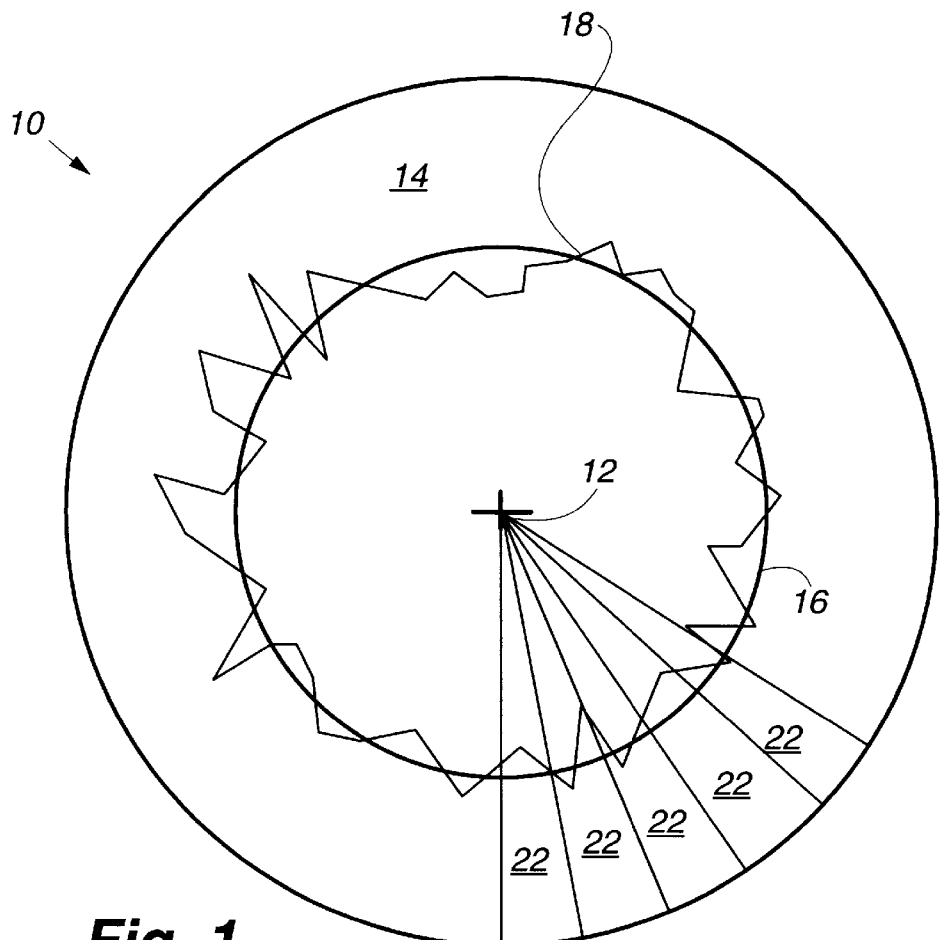
FIG. 1 is a top view of a data storage disk illustrating a perturbed data track that can be compensated for in accordance with the present invention.

FIG. 1 illustrates a data storage disk 10 that is used to store digital data in a magnetic disk drive system. The disk 10 is substantially circular in shape and includes a center point 12 located in the center of the disk. The disk 10 also includes a plurality of tracks on an upper surface 14 of the disk 10 for storing the digital data. As discussed above, each of the tracks is ideally non-perturbed and ideally shares a common center 12 with the disk 10, such as ideal track 16 illustrated in FIG. 1. Due to system imperfections, however, actual written tracks on the disk 10 can be perturbed as compared to ideal tracks, such as non-ideal track 18 in FIG. 1. Consequently, transducer positioning is not as accurate on track 18 than it would be on an ideal track. The present invention provides a system that allows a transducer to follow the path of an ideal track, such as the path of track 16, using the servo information written in a non-ideal track, such as track 18. The system of the present invention therefore approximates a system having an almost perfect servo track written disk.

As illustrated in FIG. 1, the tracks on the disk 10 are each divided into a plurality of sectors 22. Each sector 22 is divided into a servo data portion and a user data portion (not shown). The servo data portion includes, among other things, information for use by the disk drive in locating a transducer above a desired track of the disk 10. When a host computer requests that data be read from or written to a particular track/sector of the disk 10, the transducer must first be moved to the track and then must be positioned at a predetermined location with respect to the centerline of the track before data transfer can take place. For purposes of illustrating the present invention, it will be assumed that the transducer should be placed on the track centerline in order to read from and write to the disk. It should be noted that the invention is not limited to solely reading and writing when the transducer is placed at its track centerline.

Referring again to FIG. 1, the disk drive uses the information stored in the servo data portion of each sector to first locate the desired track and to then appropriately position the transducer with respect to the centerline of the desired track. The user data portion of each sector 22 includes data that can be accessed by an external host computer for use in connection with a central processing unit (CPU) located therein. In general, the number of sectors per track on the disk is a matter of design choice. The number may be dictated by, for example, a required servo update rate for the disk drive.

Figure 2:
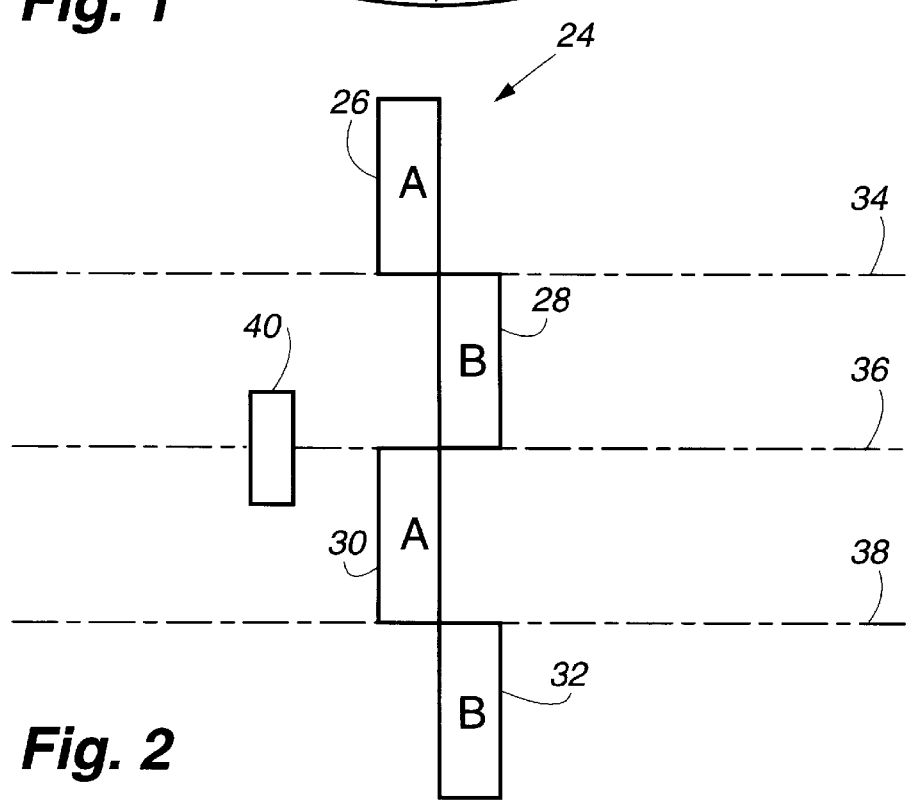
FIG. 2 is a schematic diagram of a servo burst pattern that is used to position a transducer with respect to a track centerline.

FIG. 2 illustrates a typical servo pattern 24 stored within the servo portion of a sector 22 for use in centering a transducer 40 on a desired track. The servo pattern 24 includes a plurality of servo bursts 26–32 that define the centerlines 34–38 of the tracks of the disk 10. The bursts 26–32 are divided into A bursts 26, 30 and B bursts 28, 32 that are each approximately a track-width wide and which alternate across the disk surface. The boundary between an A burst and an adjacent B burst (e.g., A burst 30 and B burst 28) defines the centerline (e.g., centerline 36) of a track on the disk. To center the transducer 40 using the A and B bursts, the transducer 40 is first moved to the desired track during a seek operation and, once there, is allowed to read the A and B bursts on the desired track. The signal magnitudes resulting from reading the A and B bursts are then combined (such as by subtracting the B burst magnitude from the A burst magnitude) to achieve an error signal, known as the position error signal (PES), which is indicative of the distance between the center of the transducer 40 and the centerline of the desired track. The PES signal is used by the disk drive to change the position of the transducer 40 to one that is closer to the desired (centered) position. This centering process is repeated for each successive sector on the track until the requested read/write operation has been performed in the appropriate sector 22 of the disk 10. It should be appreciated that other schemes for storing servo information on the magnetic media (such as schemes using zones, constant linear density (CLD) recording, split data fields, and/or hybrid servo) can also be used in accordance with the present invention.

The A and B bursts 26–32, as well as other servo information, are written to the surface 14 of the disk 10 using a servo track writer (STW) after the disk 10 is assembled into the disk drive during the manufacturing process. It is these A and B bursts which define the location of the written tracks on the disk 10. That is, on a non-ideal track (such as track 18 of FIG. 1) the A and B bursts are written such that the centerline of the track is not smooth, but rather is perturbed. In conceiving of the present invention, it was appreciated that a transducer could be made to follow the path of an ideal track by adding an appropriate offset value to the PES signal in each of the sectors of a particular track. As illustrated in FIG. 1, the offset amount between the centerline of the non-ideal track 18 and the path of the ideal track 16 is different in each sector 22 of the track. The offset values that are used to modify the PES signal are known as STW_RRO values. In accordance with the present invention, STW_RRO values are stored within the servo portions of each sector 22 of the disk for use in positioning the transducer 40 on an ideal track path during track following operations.

In one aspect of the present invention, a method and apparatus is provided for determining the STW_RRO values that are later stored in the servo portions of the disk 10. The method and apparatus uses a non-causal impulse response to calculate the STW_RRO values from measured PES values of the drive. As described above, once determined, the STW_RRO values are then stored on the disk surface for use during track following operations.

If the transducer 40 is to follow a perturbed path, such as that of non-ideal track 18, the position of the transducer 40 must be constantly adjusted as the disk 10 rotates. Therefore, when performing conventional track following on a non-ideal track, adjustments are constantly being made to the transducer position to keep it centered on the track. The transducer position is adjusted, as described above, by calculating a PES signal for each sector 22 of the track and using the PES signal to create a control signal for a movement means (such as a voice coil motor) to move the transducer 40 an appropriate amount in each sector. Because the transducer position is continuously being adjusted, perfect or near perfect registration between the transducer center and the center of the track is rarely achieved. This can create problems such as high track misregistration values.

Figures 3, 4:
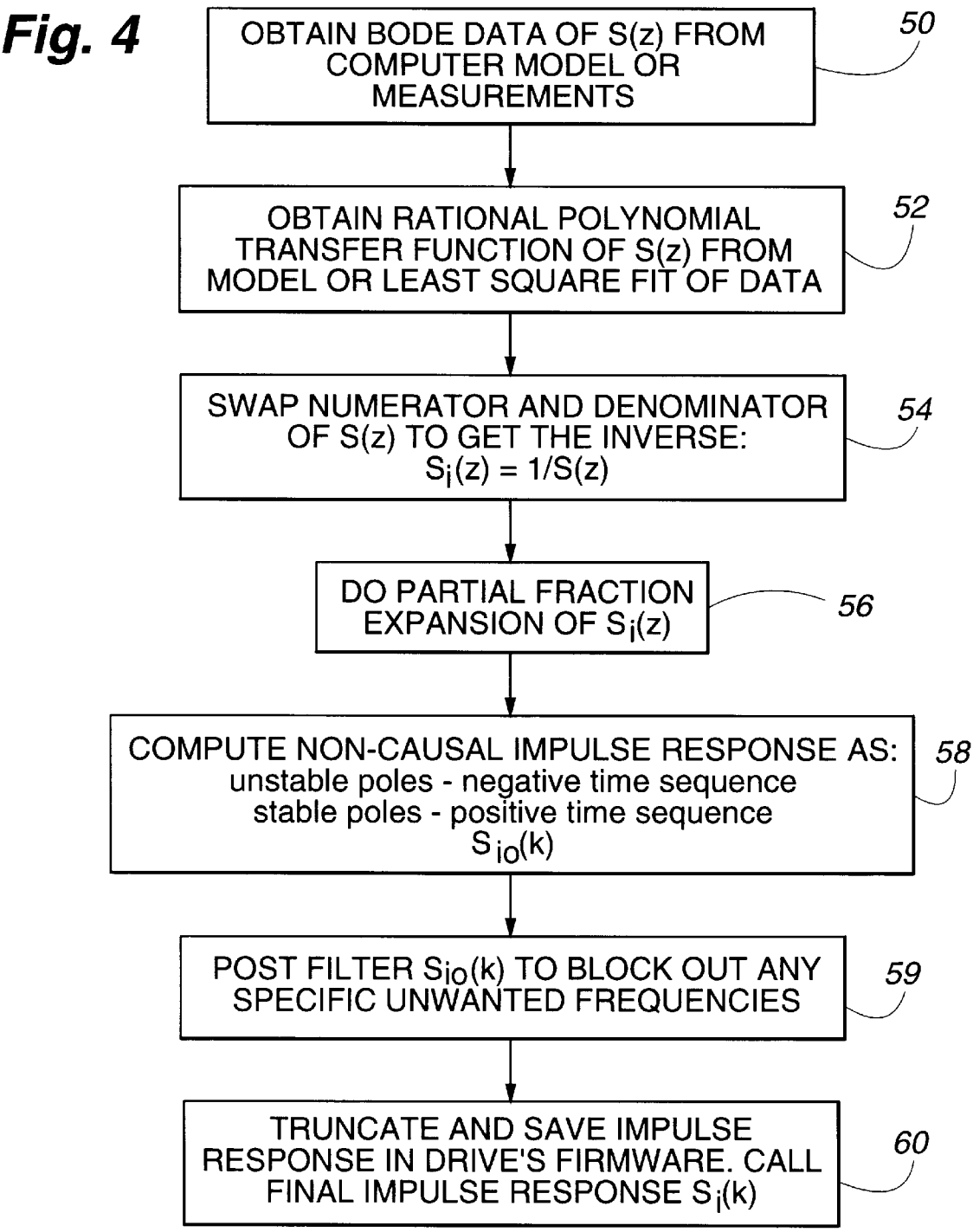
FIG. 3 is a block diagram illustrating the relationship between servo track writer repetitive run-out (STW_RRO) and the position error signal (PES_RRO that is determined for a particular track.
FIG. 4 is a flowchart illustrating a method for determining a non-causal impulse response that can be used to calculate servo track writer repetitive run-out (STW_RRO) values in accordance with the present invention.

In conceiving of the present invention, it was appreciated that the PES values that are calculated for each sector of a given track (which henceforth will be referred to as PES_RRO values) are related to the STW_RRO values for the track by a predetermined transfer function $S(z)$, as illustrated in FIG. 3. The transfer function, in general, describes how the servo control system reacts to and follows the perturbed track 18. That is, STW_RRO is the stimulus and PES_RRO is the response. To determine the STW_RRO values using the measured PES_RRO values, therefore, one needs to find the inverse transfer function $S^{-1}(z)$ and to apply the PES_RRO values thereto. However, the inverse transfer function $S^{-1}(z)$ is generally unstable due to the action of certain elements within the servo control loop, such as the zero-order hold unit. Thus, conventional methods for determining the impulse response of the inverse transfer function $S^{-1}(z)$ often result in divergent behavior.

In accordance with the present invention, it was determined that the PES_RRO data could be processed in non-real time using a non-causal impulse response of the inverse transfer function. A non-causal system is a system that has an impulse response that is nonzero for negative time. That is, the system is capable of producing a response before any excitation is applied to the input of the system. As such, non-causal systems are generally regarded as non-physically-realizable systems. However, as illustrated by the present invention, non-causal impulse responses can be utilized as analysis tools to perform non-real time calculations.

FIG. 4 is a flowchart illustrating a method for determining the non-causal impulse response of the inverse error transfer function of a servo-loop in accordance with the present invention. It should be noted that the steps outlined in FIG. 4 are generally performed off-line by an engineer and are stored into the disk drive system's firmware.

In step 50, a command is sent to the disk drive to obtain bode data of S(z) (i.e., poles and zeros), where S(z) represents the error transfer function of the closed-loop servo system. The bode data is obtained in a conventional manner by either computer modeling or by direct measurement using appropriate instrumentation, as is well-known to those in the art.

Next, in step 52, a rational polynomial transfer function of S(z) is obtained using the bode information by performing a least square fit of either the computer-modeled data or the measured data. In the case of the present invention, it is preferred that the rational polynomial transfer function be obtained by performing a least square fit on the computer-modeled data. One computer program which is capable of performing the requisite computer modeling is commercially known as Matlab (although other similar programs may be used). The rational polynomial transfer function of S(z) can be described by the following equation:

$$S(z) = \frac{n_0 + n_1 z^{-1} + \ldots + n_N z^{-N}}{d_0 + d_1 z^{-1} + \ldots + d_D z^{-D}}$$

where $n_0 \ldots n_N$ and $d_0 \ldots d_D$ are real and constant coefficients of the transfer function, N and D are integers and represent the order of the transfer function, and z is the Z-transform complex variable. The values of the coefficients, N and D, depend on the nature of the servo system. This form of transfer function is well-known to those in the art.

The inverse transfer function, $S_i(z)$, is then determined by swapping the numerator and denominator of the rational polynomial transfer function (step 54). The resulting equation is:

$$S_i(z) = \frac{d_0 + d_1 z^{-1} + \ldots + d_D z^{-D}}{n_0 + n_1 z^{-1} + \ldots + n_N z^{-N}}$$

A partial fraction expansion of the inverse transfer function, Si(z), is then performed (step 56) which yields the following equation:

$$S_i(z) = \frac{r_1}{1 - p_1 z^{-1}} + \ldots + \frac{r_m}{1 - p_m z^{-1}}$$

where $r_1 \ldots r_m$ and $p_1 \ldots p_m$ are constant real-valued numbers, and m is a constant integer. For the present invention, it is preferred that the partial fraction expansion of $S_i(z)$ also be performed using the Matlab computer program (again, other programs may be used).

The partial fraction expansion of the inverse transfer function is then used to compute the non-causal impulse response $S_{io}(k)$ (step 58), where k is the sector time index used in the time domain. The unstable poles of the non-causal impulse response represent the negative time portion of the response while the stable poles of the non-causal impulse response represent the positive time portion of the response. The non-causal impulse response can be represented by the following equation:

$$S_{io}(k) = \sum_{i=1}^{m} \alpha_i(k)$$

where $$\alpha_i(k) = r_i p_i^k, k \geq 0 \text{ if } |p_i| < 1$$

and $$\alpha i(k) = -r_i p_i^k, k < 0 \text{ if } |p_i| \geq 1$$

In the above equations, $\alpha_i$'s represent individual constituent impulse responses that are summed together to form $S_{io}(k)$.

A post filtering step is then performed on $S_{io}(k)$ so that the non-causal impulse response can be refined by blocking specific unwanted frequencies (step 59). In the preferred embodiment, a non-causal high pass filter is combined with $S_{io}(k)$ to produce a final response, $S_f(k)$. Finally, the non-causal impulse response is truncated and saved in the disk drive's firmware (step 60) for later use in determining the STW_RRO values. More specifically, the portions of $S_f(k)$ which converge to zero or otherwise settle-out are truncated. The truncation is performed so that the computational burden, when determining the STW_RRO values, is minimized.

As mentioned above, it should be noted that all of the steps performed in connection with FIG. 4 (to derive the non-causal impulse response) are generally performed by an engineer prior to the factory calibration process described below. The derived non-causal impulse response is then stored in the disk drive's firmware.

Figure 5:
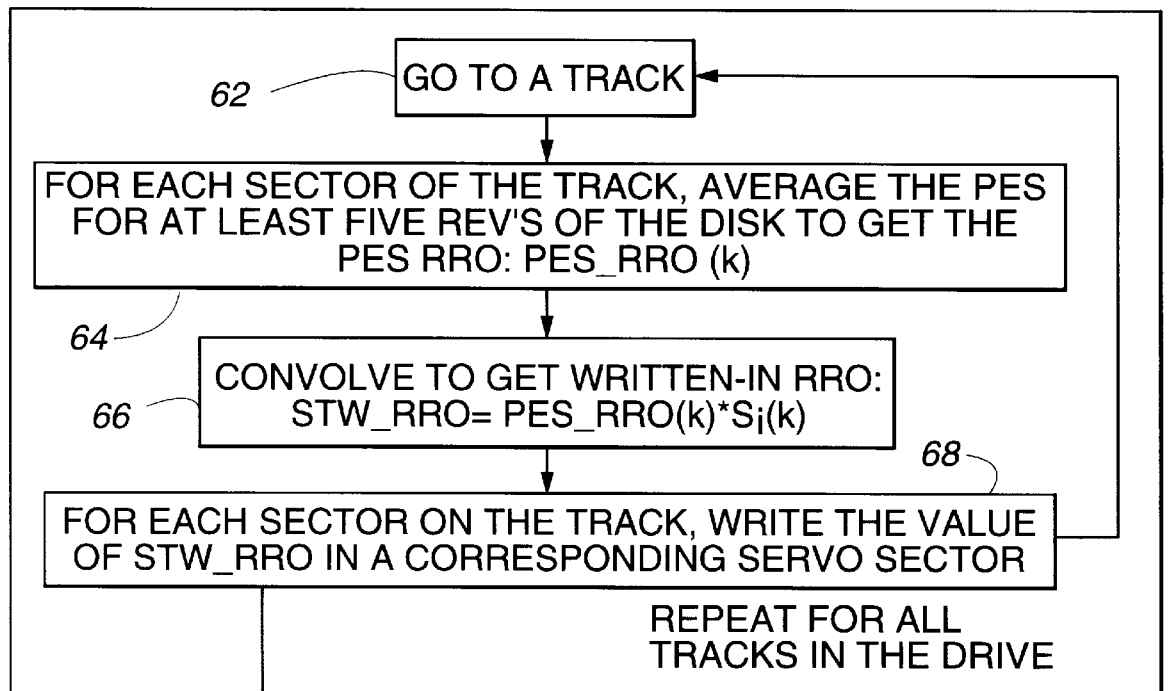
FIG. 5 is a flowchart illustrating methods in accordance with the present invention for calculating servo track writer repetitive run-out (STW_RRO) values using a non-causal impulse response and for using the STW_RRO values so calculated to compensate for the perturbed nature of the data tracks.
Figure 5:
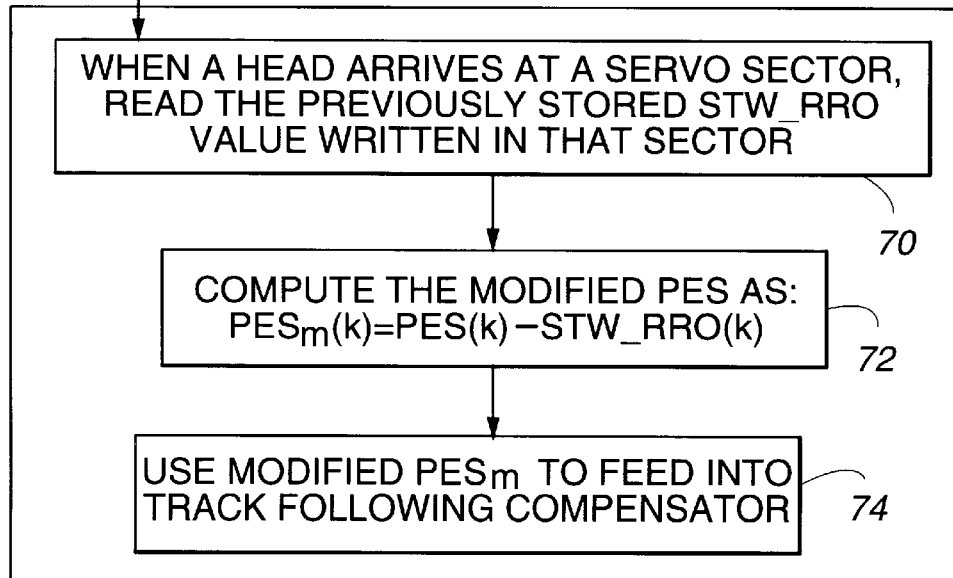

FIG. 5 is a flowchart illustrating a method for determining STW_RRO values using the non-causal impulse response stored in the firmware (as described in connection with FIG. 4) and measured PES data (to be described in connection with FIG. 5). The steps outlined on the top half of FIG. 5 are performed during the factory calibration process, while the steps on the bottom half of FIG. 5 are performed during regular use of the disk drive.

During factory calibration of a disk drive, a seek operation is performed (step 62) to move the transducer to a predetermined track of the disk 10. Once on the desired track, the transducer reads the servo data in the servo portions of the sectors of the track for multiple revolutions of the disk 10.

A calibration controller then calculates average PES values for each sector of the track for a predetermined number of revolutions of the disk (step 64), which is preferably five or more. The average PES values represent the PES_RRO of the disk. PES averages are used so that the repetitive written-in track profile can be distinguished from the non-repetitive portion of it (i.e., random noise), as will be understood by those skilled in the art.

The STW_RRO values are then calculated by convolving the filtered PES_RRO values with the non-causal impulse response, $S_i(k)$, stored in the disk drive's firmware (step 66), to be described in further detail in connection with FIG. 7. The filtered STW_RRO values are then stored in the appropriate servo sectors on the disk surface (step 68).

As described above, determination of the STW_RRO values is performed at the drive level rather than by using a STW. This increases the accuracy of the determination considerably as drive level effects, such as PES channel variations, are accounted for. Furthermore, by determining the STW_RRO at the drive level, valuable STW time is not consumed, thereby avoiding decreases in manufacturing throughput and efficiency (as will be understood by those skilled in the art).

During normal disk drive operation, the transducer reads the STW_RRO value stored in each servo sector of a desired track (step 70). The STW_RRO value is then used to modify the calculated PES value to cancel the offset between the non-ideal track and the desired (ideal) transducer path (step 72). In the preferred embodiment of the invention, the STW_RRO value is subtracted from the calculated PES value to obtain a modified PES ($PES_m$). The modified PES value is then applied to the track following compensator where it is converted to a voice coil motor control signal (step 74).

Figure 6:
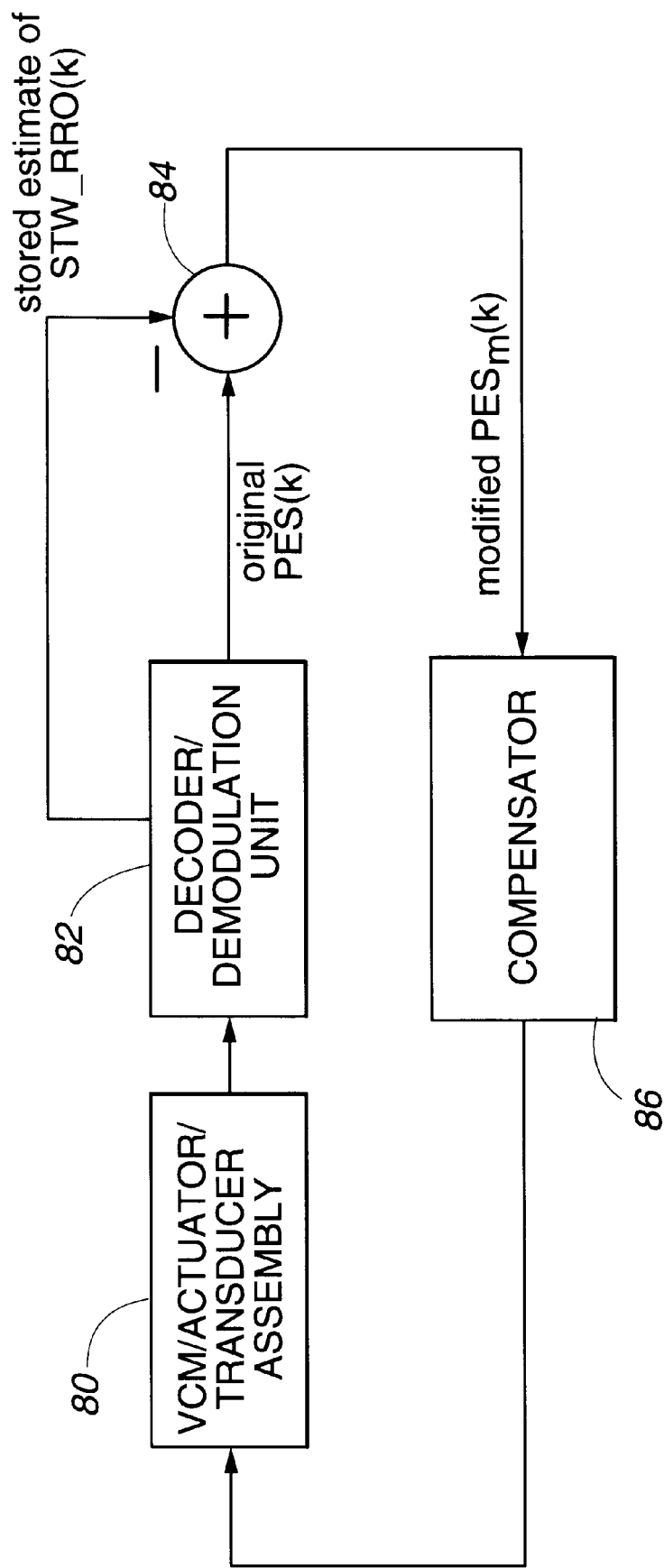
FIG. 6 is a block diagram illustrating a servo-loop in accordance with the present invention for canceling the STW_RRO so that a transducer follows a desired ideal or non-perturbed path; and, FIG. 7 illustrates, in diagrammatic form, the operation of a non-causal filter which is used to convolve the PES_RRO with the non-causal impulse response, $S_r(k) s_t(k)$, as set forth in step 66 of FIG. 5.

FIG. 6 is a block diagram illustrating the cancellation of STW_RRO in a disk drive in one embodiment of the present invention. The VCM/actuator/transducer assembly 80 outputs a signal that is indicative of transducer position. The signal is generated by reading servo information within a servo sector on the surface of the disk. For example, the servo signal can include A/B burst information. The position signal is processed by a decoder/demodulation unit 82 to create an original PES signal, PES(k), that indicates the distance of the transducer from a predetermined track centerline.

The VCM/actuator/transducer assembly 80 also outputs a signal that is indicative of the STW_RRO values. The signal is generated by reading information stored on the surface of the disk which corresponds to the STW_RRO value for that particular sector. The signal is then processed by the decoder/demodulation unit 82 to obtain the stored value of the servo track writer repetitive run-out (STW_RRO(k)).

Because the predetermined track centerline is offset from the desired (ideal) transducer path, the original PES signal (PES(k)) is delivered to the subtractor 84 which subtracts the STW_RRO value from the original PES signal to create a modified PES signal ($PES_m(k)$). The modified PES signal is delivered to a compensator 86 which converts the modified PES signal into a control signal for the VCM. In response to the control signal, the VCM keeps the transducer substantially centered above the desired non-perturbed transducer path. Because the transducer is maintained on a substantially non-perturbed path, very little physical adjustment of transducer position is required from servo sector to servo sector, and track misregistration is reduced.

In the preferred embodiment, the STW_RRO value is read by the transducer from the same servo sector that provided the position signal. It should be appreciated, however, that the STW_RRO value may be stored in other locations within the disk drive, such as in a random access memory (RAM) or the like.

Figure 7:
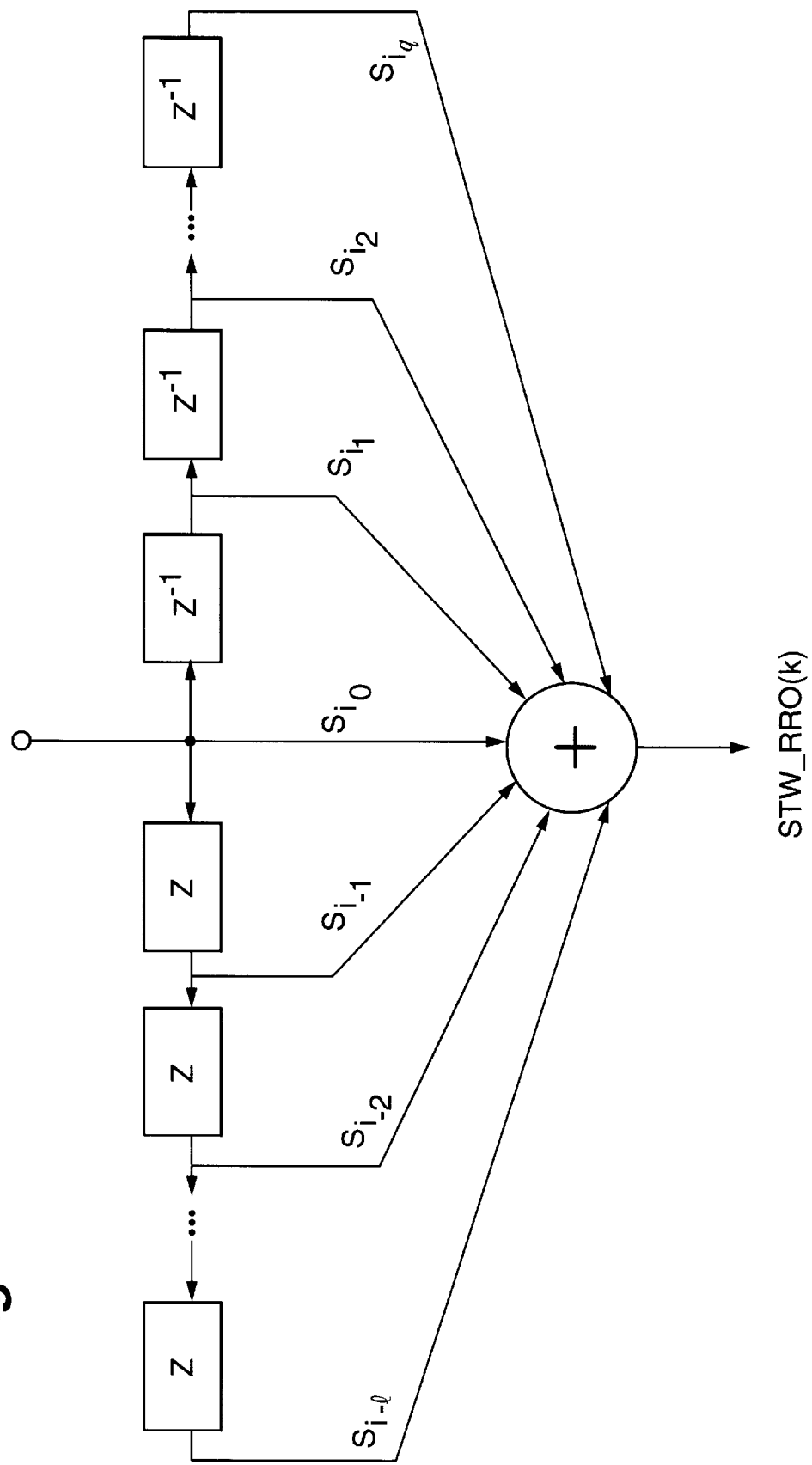

FIG. 7 illustrates, in diagrammatic form, the operation of a non-causal filter which is used to convolve the PES_RRO with the non-causal impulse response, $S_i(k)$, as set forth in step 66 of FIG. 5. As shown in FIG. 7, PES_RRO(k) is convolved with the non-causal impulse response resulting in the cancellation values (STW_RRO(k)). The STW_RRO (k) values computed by the non-causal filter can be described as follows:

$$\text{STW\_RRO}(k) = \sum_{n=-1}^{q} s_i(n)\text{PES\_RRO}(k-n)$$

where l+q+1 is the length of the filter or the number of delay taps; k is the sector time index; and, n is a dummy variable.

Although the present invention has been described in conjunction with its preferred embodiment, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method of generating and using compensation values for a disk drive, the method comprising the steps of:

providing a data storage disk in the disk drive, the disk having a track, the track having an ideal shape and an actual written shape;

deriving a non-causal impulse response, including
        obtaining bode data of the disk drive's error transfer function (S(z));
        performing a least square fit to calculate a rational polynomial transfer function of S(z);
        inverting the rational polynomial transfer function of S(z) to obtain the inverse, $S_i(z)$, thereof; and
        performing a partial fraction expansion of $S_i(z)$ to obtain the non-causal impulse response;

generating the compensation values using the non-causal impulse response; and estimating the actual written shape of the track using the compensation values and the disk drive.

2. The method of claim 1 wherein deriving the non-causal impulse response includes filtering an intermediate non-causal impulse response to block unwanted frequencies.

3. The method of claim 1 wherein deriving the non-causal impulse response includes truncating portions of an intermediate non-causal impulse response which converge to zero or otherwise settle out.

4. The method of claim 1 wherein the disk drive includes firmware and the method includes storing the non-causal impulse response in the firmware.

5. The method of claim 1 including convolving the non-causal impulse response with measured drive-level repetitive run out values to obtain the compensation values.

6. The method of claim 5 wherein the disk drive includes a transducer adapted to read information from and write information to the disk and the method includes adjusting the transducer so that it reads from and writes to a position relative to a centerline of the ideal shape of the track.

7. The method of claim 6 wherein the compensation values indicate a positional difference between the ideal shape of the track and the actual written shape of the track.

8. The method of claim 7 wherein the actual written shape of the track includes a centerline and the compensation values indicate a positional difference between the centerline of the ideal shape of the track and the centerline of the actual written shape of the track.

9. The method of claim 8 including storing the compensation values on the disk.

10. The method of claim 9 including reading the stored compensation values from the disk.

11. The method of claim 10 including obtaining an original position error signal indicating the position error of the transducer from the centerline of the actual written shape of the track.

12. The method of claim 11 including subtracting one of the compensation values from the original position error signal to obtain a modified position error signal for positioning the transducer along the centerline of the ideal shape of the track.

13. The method of claim 12 including delivering the modified position error signal to a compensator.

14. The method of claim 13 including generating a compensation signal to position the transducer along the centerline of the ideal shape of the track.

15. The method of claim 8 wherein the track includes sectors including servo regions and data regions, the method further including storing the compensation values in the servo regions.

16. The method of claim 15 including calculating the compensation values for one or more designated sectors of the track.

17. The method of claim 15 including calculating the compensation values for all sectors of the track.

18. The method of claim 8 including storing the compensation values in a random access memory in the disk drive.

19. The method of claim 5 wherein the repetitive run-out values are each measured by averaging position error signals over a predetermined number of revolutions of the disk.

20. The method of claim 1 including calculating, in part, the non-causal impulse response by computer modeling.

* * * * *